US012730579B2

(12) United States Patent
Bassett

(10) Patent No.: US 12,730,579 B2
(45) Date of Patent: Sep. 8, 2026

(54) OBJECT STORAGE AND ACCESS MANAGEMENT SYSTEMS AND METHODS

(71) Applicant: NantCell, Inc., Culver City, CA (US)

(72) Inventor: Aaron Randolph Bassett, Laconia, NH (US)

(73) Assignee: NantCell, Inc., Culver City, CA (US)

( * ) Notice: Subject to any disclaimer, the term of this patent is extended or adjusted under 35 U.S.C. 154(b) by 0 days.

(21) Appl. No.: 18/758,295

(22) Filed: Jun. 28, 2024

(65) Prior Publication Data

US 2024/0354026 A1 Oct. 24, 2024

Related U.S. Application Data

(63) Continuation of application No. 18/125,890, filed on Mar. 24, 2023, now Pat. No. 12,050,802, which is a continuation of application No. 17/316,262, filed on May 10, 2021, now Pat. No. 11,662,938.

(60) Provisional application No. 63/022,652, filed on May 11, 2020.

(51) Int. Cl.

| | |
|---|---|
| ***G06F 3/06*** | (2006.01) |
| ***G06F 21/62*** | (2013.01) |
| ***H03M 13/15*** | (2006.01) |

(52) U.S. Cl.

CPC .......... *G06F 3/0652* (2013.01); *G06F 3/0619* (2013.01); *G06F 3/0635* (2013.01); *G06F 3/064* (2013.01); *G06F 3/067* (2013.01); *G06F 3/0683* (2013.01); *G06F 21/6254* (2013.01); *H03M 13/1515* (2013.01)

(58) Field of Classification Search

CPC .... G06F 3/0652; G06F 3/0619; G06F 3/0635; G06F 3/064; G06F 3/067; G06F 3/0683; G06F 21/6254; H03M 13/1515

See application file for complete search history.

(56) References Cited

U.S. PATENT DOCUMENTS

| | | | | |
|---|---|---|---|---|
| 8,683,591 | B2 | 3/2014 | Wittenschlaeger | |
| 9,858,325 | B1 * | 1/2018 | Suver | G06F 16/278 |
| 10,133,742 | B2 | 11/2018 | Soon-Shiong | |

(Continued)

OTHER PUBLICATIONS

S2geometry, S2 Cells, Mar. 17, 2018, https://web.archive.org/web/20180317155431/https://s2geometry.io/devguide/s2cell_hierarchy (Year: 2018).*

(Continued)

*Primary Examiner* — Ryan Bertram

(74) *Attorney, Agent, or Firm* — Harness Dickey & Pierce P.L.C.

(57) ABSTRACT

A geographically distributed erasure coding system includes multiple computer readable, non-transitory storage memories capable of storing a digital dataset including multiple object blocks, where each storage memory is configured to store one or more of the object blocks of the dataset according to an erasure coding policy. The system includes one or more processors configured to implement the erasure coding policy by distributing the multiple object blocks of the dataset to the multiple storage memories according to distribution criteria of the erasure coding policy, and the distribution criteria include at least one status parameter associated with each storage memory. The multiple storage memories are geographically distributed at different locations from one another.

20 Claims, 5 Drawing Sheets

(56) References Cited

U.S. PATENT DOCUMENTS

| | | | | |
|---|---|---|---|---|
| 10,140,683 | B2 | 11/2018 | Vaske et al. | |
| 10,607,343 | B2 | 3/2020 | Song et al. | |
| 10,637,799 | B2 | 4/2020 | Wittenschlaeger | |
| 11,476,874 | B1 * | 10/2022 | Li | G06F 3/0652 |
| 2014/0317053 | A1 * | 10/2014 | Grube | H04L 67/1097<br>707/609 |
| 2015/0261455 | A1 * | 9/2015 | Gough | H04L 69/40<br>714/6.24 |
| 2019/0079869 | A1 | 3/2019 | Baldi et al. | |
| 2019/0332473 | A1 * | 10/2019 | Yang | H03M 13/373 |
| 2020/0034040 | A1 | 1/2020 | Garman | |
| 2021/0034264 | A1 * | 2/2021 | Ali | G06F 3/061 |
| 2021/0081403 | A1 * | 3/2021 | Tian | G06F 16/2365 |
| 2021/0097107 | A1 * | 4/2021 | Patel | G06F 3/0641 |
| 2021/0141759 | A1 * | 5/2021 | Mahony | G06Q 10/10 |
| 2021/0263667 | A1 * | 8/2021 | Whitlock | G06F 11/3447 |
| 2021/0405908 | A1 | 12/2021 | Bassett | |
| 2023/0229335 | A1 | 7/2023 | Bassett | |

OTHER PUBLICATIONS

S2 Geometry, S2 Cells & Overview, Feb. 2020, https://web.archive.org/web/20200219143238/http://s2geometry.io/about/overview (Year: 2020).*

Staff Contributor, "What is Network Topology? Best Guide to Types and Diagrams," p. 1-20 (2019).

Office Action from corresponding U.S. Appl. No. 17/316,262 dated Oct. 13, 2022.

Office Action from corresponding U.S. Appl. No. 17/316,262 dated Nov. 18, 2022.

* cited by examiner

508

Example Erasure Coding Policy

```
<policy>
	<chunk type="data">
		<importance> high </importance>
		<constraints> latency < 100ms
			fire risk <5% annual
			earthquake risk < 1% annual
			100 year floodplain = TRUE, <10% total data stored at location
			distance > 100 miles from other storage locations </constraints>
		<conditions> cost < $100 per unit volume of storage
			hurricane risk < 5% annual
			500 year floodplain = TRUE, <30% total data stored at location
			system availability > 99.99%
			total capacity available > 20% </conditions>
		<security> medium </security>
	</chunk>

	<chunk type="parity">
		<importance> low </importance>
		<constraints> latency < 200ms
			fire risk <10% annual
			earthquake risk < 2% annual
			100 year floodplain = TRUE, <10% total data stored at location
			distance > 100 miles from other storage locations </constraints>
		<conditions> cost < $100 per unit volume of storage
			hurricane risk < 10% annual
			500 year floodplain = TRUE, <50% of total data stored at location
			system availability > 99%
			total capacity available > 10% </conditions>
		<security> medium </security>
	</chunk>
<policy>
```

FIG. 5

OBJECT STORAGE AND ACCESS MANAGEMENT SYSTEMS AND METHODS

CROSS-REFERENCE TO RELATED APPLICATIONS

This application is a continuation of U.S. Nonprovisional application Ser. No. 18/125,890, filed on Mar. 24, 2023, which is a continuation of U.S. Nonprovisional application Ser. No. 17/316,262, filed on May 10, 2021, which claims the benefit of U.S. Provisional Application No. 63/022,652, filed on May 11, 2020. The entire disclosures of each of the above applications are incorporated herein by reference.

FIELD

The present disclosure generally relates to digital object storage and computer-based access management systems and methods.

BACKGROUND

Erasure coding is a method of digital data protection in which data is broken into chunks, expanded and encoded with redundant data pieces and stored across a set of different locations or storage media. Erasure coding may enable data that becomes corrupted at some point in the disk storage process to be reconstructed by using information about the data that is stored in other chunks. Erasure coding may be used instead of traditional Redundant Array of Independent Disks (RAID) storage, because of the ability of erasure coding to reduce the time and overhead required to reconstruct data.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one example embodiment, a geographically distributed erasure coding system includes multiple computer readable, non-transitory storage memories capable of storing a digital dataset including multiple object blocks, with each storage memory configured to store one or more of the object blocks of the dataset according to an erasure coding policy. The system also includes one or more processors configured to implement the erasure coding policy to distribute the multiple object blocks of the dataset to the multiple storage memories according to distribution criteria of the erasure coding policy. The distribution criteria includes at least one current status parameter associated with each storage memory. The multiple storage memories are geographically distributed at different locations from one another.

According to another example embodiment of the present disclosure, a computer-implemented method of managing a geographically distributed erasure coding system is disclosed. The system includes multiple computer readable, non-transitory storage memories for storing a digital dataset including multiple object blocks, with each storage memory configured to store one or more object blocks of the dataset according to an erasure coding policy. The method includes implementing, via one or more processors, the erasure coding policy to distribute the multiple object blocks of the dataset to the multiple storage memories according to distribution criteria of the erasure coding policy. The distribution criteria includes at least one current status parameter associated with each storage memory, and the multiple storage memories are geographically distributed at different locations from one another.

According to yet another example embodiment of the present disclosure, a non-transitory computer readable medium including computer-executable instructions, possibly as part of a software package or software suite, where the computer-executable instructions are executable by a processor to implement an erasure coding policy to distribute multiple object blocks of a digital dataset to multiple computer readable, non-transitory storage memories according to distribution criteria of the erasure coding policy. Each storage memory is configured to store one or more object blocks of the dataset according to an erasure coding policy. The distribution criteria includes at least one current status parameter associated with each storage memory, and the multiple storage memories are geographically distributed at different locations from one another.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 5 illustrates example pseudo code for an erasure coding policy.

In the drawings, reference numbers may be reused to identify similar and/or identical elements.

DETAILED DESCRIPTION

Object Storage and Access Management System

Figure 1:
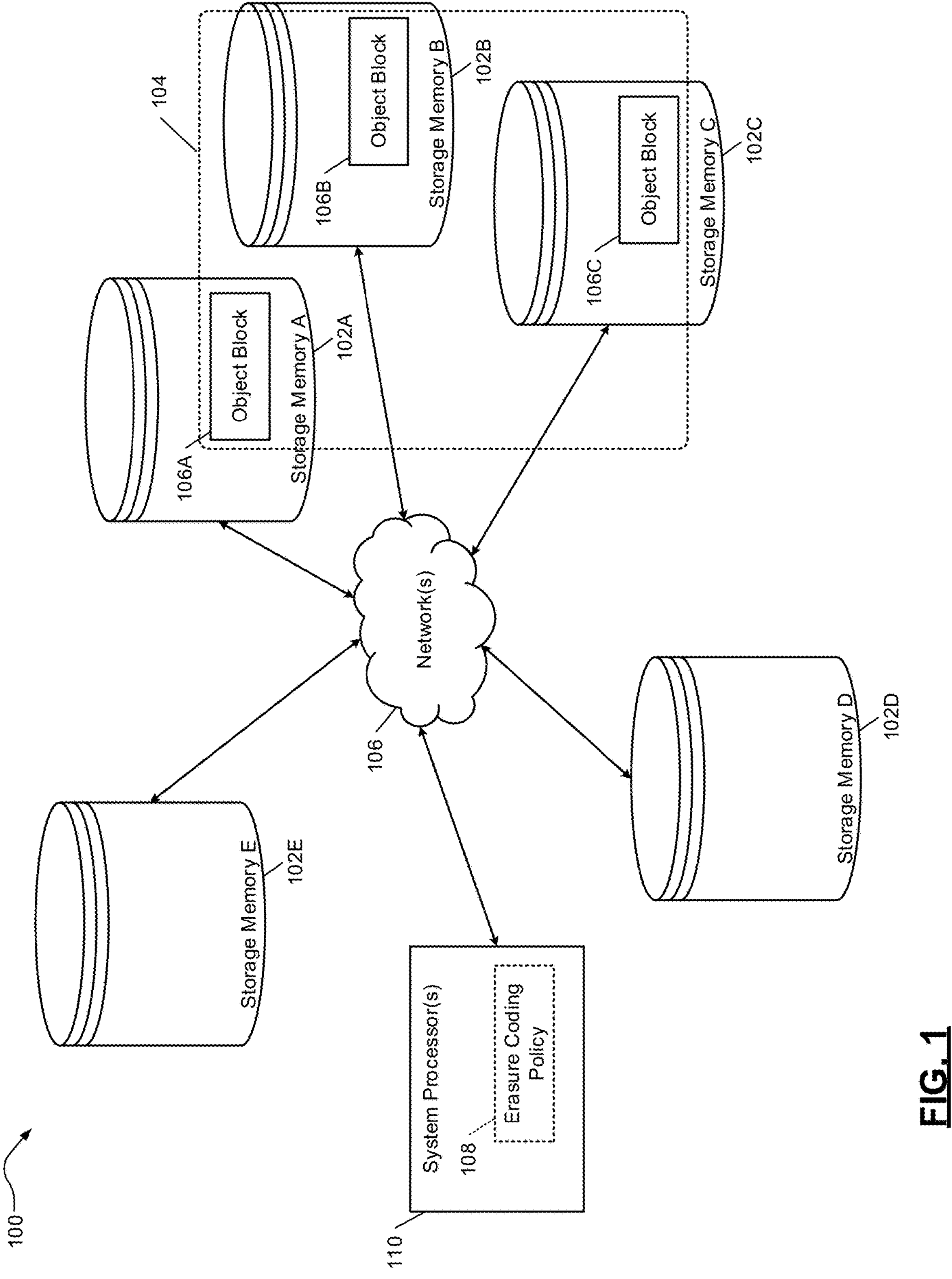
FIG. 1 is a functional block diagram of a geographically distributed erasure coding system, according to one example embodiment of the present disclosure.

FIG. 1 illustrates an exemplary computer-based system 100, in which one or more aspects of the present disclosure may be implemented. Although the system 100 is presented in one arrangement in FIG. 1, other embodiments may include systems arranged otherwise depending, for example, on a manner in which components of the system are located, use cases of the system for different implementations, etc.

In the illustrated embodiment, a geographically distributed erasure coding system 100 includes multiple storage memories 102A-E. As shown in FIG. 1, the storage memories 102A-C each store one of multiple object blocks 106A-C of a digital dataset 104, according to an erasure coding policy 108. One should appreciate FIG. 1 is for illustrative purposes and that any practical number of storage memories or object blocks are contemplated. Geographic distribution includes arrangements where the storage memories 102A-C storing the multiple object blocks 106A-C are in physically separated locations. For example, the object blocks 106A-C may be stored at different locations (e.g., buildings, data centers, server farms, etc.) that are separated by less than 100 yards (such as object blocks 106A-C stored at physically separated locations on a same business site), up to locations that are separated by thousands of miles (such as data centers located in different states, different countries, etc.). The separation distance may be determined based on predicted types of disasters that provide a risk of damaging the storage of the object blocks 106A-C. For example, using different buildings may protect against a risk of fire, storing data hundreds of miles apart or more may protect against natural disasters like tornadoes or earthquakes, storing the data in different countries may protect against political risk, etc.

In various implementations, the erasure coding policy 108 may include one or more metrics that define a ratio of risk probability to distance. For example, a level of fire risk may determine a minimum distance, desired distance, optimal distance, etc., between storage locations to avoid multiple storage locations being consumed by the same fire. The distance value may be increased as the level of fire risk increases (e.g., buildings located in areas susceptible to wildfires versus buildings located in frigid snowy climates without vegetation between buildings, etc.). Areas with higher risks of hurricanes, earthquakes, etc., may provide metric values that suggest larger distances beyond the spread of a normal hurricane, earthquake, etc., event. A geo-political risk metric may specify that a distance between storage locations should extend across at least one boundary of a state, a country, etc., where there is a higher risk of political instability in a region. These metrics may be weighted by a risk score for each storage location, and may be balanced by the effects of increase distance. For example, a higher natural disaster risk may suggest a minimum physical separation distance while a latency value places a constraint or condition to avoid separating the storage locations by a distance of more than needed to reduce the risk (e.g., storage locations should not be separated by more than 1× the normal earthquake damage diameter, not more than 2× the normal earthquake damage diameter, etc.). Risk values may be determined using historical climate data for storage locations, historical natural disaster data for locations, historical (and particularly recent) political stability data for locations, etc.

As explained further below, although the object blocks 106A-C are distributed only to a subset of storage memories such as the storage memories 102A-C in FIG. 1, in other implementations the object blocks 106A-C may be stored in the storage memories 102D-E, the object blocks 106A-C may be reallocated to the storage memories 102D-E, etc., such that each object block 106A-C may be stored in any one of the storage memories 102A-E according to the erasure coding policy 108. For example, the object blocks 106A-C may be distributed to storage memories in different geographic locations based on any suitable criteria, such as prioritizing geographic locations that are closer to a central processing or distribution locations, prioritizing geographic locations that have shorter transmission distances, prioritizing geographic locations that are closer to one another, latency of communications between or among storage memories, etc. In various implementations, geographic locations may be selected based on average temperatures at the locations, availability of alternative energy sources such as wind or solar at the locations, likelihood of natural disasters occurring at the locations (e.g., to avoid higher disaster risk areas to reduce the possibility of the object blocks 106A-106C being destroyed), etc. While FIG. 1 illustrates three blocks of data, any practical number of blocks may be used to facilitate a particular use case or address optimization factors (e.g., parallel transmission of blocks to storage memories in a timely fashion, cost of bandwidth, etc.).

The system 100 also includes one or more processors 110 configured to implement the erasure coding policy 108 to distribute the multiple object blocks 106A-C of the dataset 104 to the multiple storage memories 102A-E according to distribution criteria of the erasure coding policy 108. For example, the one or more processors 110 may execute a suite of software (which may include the erasure coding policy 108) on one or more devices. The devices could potentially be distributed devices operating the suite of software in a cooperative fashion, peer-to-peer fashion, or supporting each other via client-server relationships. In various implementations, the erasure coding policy 108 may be implemented by executing code (e.g., via a policy manager) that understands software language of the policy (e.g., using JSON files, XML files, etc.), and enforces the policy. Example pseudo code for an erasure coding policy is illustrated in FIG. 5. The code defining the policy may be distributed in a suite of software, executed by any suitable hardware, etc.

The distribution criteria includes at least one current status parameter (e.g., a measured value, a metric, sensor data, attributes, metadata, etc.) associated with each storage memory 102A-E. For example, a status parameter may include a latency to transmit data to the storage memory and/or read data from the storage memory, a full capacity of the storage memory, a currently available capacity of the storage memory, a cost of using the storage memory, a type of drive or other medium used by the storage memory, an age of the storage memory, a reliability of the storage memory, etc. The status parameter may be monitored by the one or more processors 110, may be reported by each storage memory or administrative systems associated with each storage memory, etc. For example, each storage memory may report more constant metrics such as a full rated capacity of the storage memory, a type of drive or other medium used by the storage memory, an age of the storage memory, etc. A storage memory could periodically report an available storage space remaining value by measuring its own current storage usage. An administrative system may report costs and rates for periods of time to use the storage memories. The processor(s) 110 may periodically measure a latency to transmit data to a storage memory or to read data from a storage memory.

The multiple storage memories 102A-E are geographically distributed at different locations from one another. In various implementations, any suitable status parameters may be used, which may be the same or different for different storage memories and different distribution criteria. In various implementations, a latency to read data from a storage memory may be periodically monitored or measured, a current available storage space of each storage memory may be monitored or measured, etc. The erasure coding policy 108 may screen for storage memories that are at least X miles from a distribution location and have at least 20% storage available, and then specify distribution to the top three lowest latency storage locations among those. A status parameter may be defined by namespace (such as a file system or other set of signs or names that are used to uniquely identify and refer to various attributes of a storage memory), ontology of different aspects of the storage memories (such as representations, category definitions and relationships between components of the storage memories), attribute-value pairs, etc. The status parameters may be defined by each storage memory, defined by the processor 110 of the system 100, etc.

For example, a site that is generating the dataset 104 (e.g., a site where the processor(s) 110 are located, an application, etc.), may determine where to store the object blocks 106A-C of the dataset 104 based on the health of different storage locations (e.g., based on a current state of the storage memories 102A-E, a current state of the network(s) connected to the storage memories 102A-E, etc.).

The distribution criteria may include any suitable parameters for determining where to distribute objects blocks 106A-C of the dataset 104. For example, the distribution criteria may include a current health status of a network connected to each storage memory 102A-E, a latency to transmit data to the storage memory 102A-E, an available bandwidth to transmit data to the storage memory 102A-E, etc. In various implementations, the status parameters may be specifically defined to include one or more values representative of an operational state of a storage memory, as opposed to a desired result or desired network state of the system 100. For example, status parameters may be managed using one or more agents, nodes, etc., that monitor the status parameters. Each storage memory or local node may have a local agent that monitors local information to generate status parameters specific to the storage memory. A master node or master agent may oversee multiple local nodes or agents in order to gather status parameters for multiple storage memories. The status parameters of the local nodes or agents could be tracked and processes using any suitable techniques, such as vector-based anomaly detection described further below. The erasure coding policy 108 may receive summarized status information from the master node in order to decide which storage memory to distribute data to, based on the summarized status parameters.

The distribution criteria may be based on geographic locations of storage memories 102A-E, such as a specific geographic location of a storage memory 102A-E, a distance between the specific geographic location of the storage memory 102A-E and a source of the dataset, a risk of data loss at the specific geographic location of the storage memory 102A-E, etc. For example, the distance could be a geographic distance in terms of yards, miles, etc. between physical locations of the storage memories. The distance could be a latency distance based on an amount of time required to transmit data to and from the storage memory, etc. In various implementations, the risk of data loss at a specific geographic location may be based on a risk of fire, flood, earthquake, hurricane, or other natural disaster at a location of a storage memory, a risk of geo-political conflict cutting off access to the storage memory, etc. Distribution criteria can include one or more required criterion, one or more optional conditions, weighted conditions, or other factors.

For example, location-specific details of site of the storage memory 102A-E may be taken into account by the erasure coding policy 108, such as a risk of flood, a risk of earthquake, almanac data, weather data, etc. Weather warnings may be monitored, and object blocks 106A-C may be stored and/or reallocated among the storage memories 102A-E based on upcoming expected events, such as hurricanes, flood reports, etc. Each of the above may be quantified and considered as a status parameter for determining where to distribute the object blocks 106A-C of the dataset 104 or when to shift blocks 106A-C to another storage memory. Consider a scenario where a site is within a 100 year floodplains. Once could establish or otherwise set a site risk due to flood as 1%. While this is a low number, a data stakeholder would likely consider storing 100% of their dataset at such as site as too risky. Thus, the data stakeholder might define the erasure coding policy based on such a risk relative to data value (e.g., only non-important data should be stored at the site, etc.) or relative to storage availability before actually storing data blocks at the site.

In some embodiments, the distribution criteria may be based on privacy concerns associated with different storage memories 102A-E, such as a specified data protection level of the storage memory 102A-E, a legal privacy or digital rights management requirement of the dataset 104, etc. The distribution criteria may be based on storage parameters of the storage memories 102A-E, such as a cost of utilizing the storage memory 102A-E, a capacity of the storage memory 102A-E, a current availability of the storage memory 102A-E, etc. In various implementations, a ratio of risk to cost may be used as part of the erasure coding policy 108. For example, the erasure coding policy may specify a ratio of, e.g., 3:1 as a threshold for using a storage memory (relative to measured values), where a highly available storage memory is used until a measure of the cost of the storage memory relative to a baseline cost exceeds three times a measure of the availability of the storage memory relative to a baseline availability. For example, if a cost of the storage memory is normally $100 per unit of storage volume, and the availability is normally 50%, the erasure coding policy 108 may continue using the storage memory until the cost exceeds $300 per unit of storage volume at 50% availability, or the availability drops below 17% while the cost remains at $100. In addition to or alternatively, such ratios might include two different parameters relative to each other. As an example, a policy might quantify risk in "points" (e.g., percentage points of risk per year). A site might have a cost per point value. In such a case, a low cost per point might be preferable over high cost per point for a specific risk (e.g., flood, rain, terrorism, etc.). However, other ratios of metrics could also be brought to bear which might alter how data is stored according to the erasure coding policy. A high cost per point for flood might be acceptable in view of risk of terrorism (e.g., current acts of terrorism, expected attacks, etc.) at other available sites.

In various implementations, different distribution criteria parameters may be combined for the determination of how to distribute the multiple object blocks 106A-C of the dataset 104 to the multiple storage memories 102A-E. For example, the erasure coding policy 108 may determine whether storage criteria are satisfied, where the storage criteria may include one or more criterions. The erasure coding policy 108 (and its associated storage criteria) may include one or more required features (e.g., constraints), and may include one or more optional features (e.g., conditions). In this example, the erasure coding policy 108 may distribute object blocks 106A-C only to storage memories that have status parameters satisfying the required features of the storage criteria, and prioritize storage memories that also satisfy the optional features. In various implementations, multiple criterions or status parameters (also referred to as criteria parameters) may be combined. For example, two criteria parameters may be combined, five criteria parameters may be combined, twenty criteria parameters may be combined, etc. Distribution criteria parameters may be combined according to specified formulas, different weights may be applied to different distribution criteria parameters, some distribution criteria parameters may be treated as absolute thresholds while others are treated as proportional targets, etc. In various implementations, optional conditions may be used to break ties where required distribution criteria parameters are equal for multiple storage memories. For example, if two storage memories both satisfy a minimum distance criteria, a maximum latency criteria, and have equal cost, an available storage optional condition may be used to break a tie (e.g., the storage memory that is currently less full as a percentage of total capacity is used for distribution). Multiple criteria parameters could be combined using scores, satisfaction levels, etc., with some parameters being required, some parameters being optional, etc. Although some example distribution criteria parameters are listed above, various implementations may include other distribution criteria parameters as desired.

Figure 4:
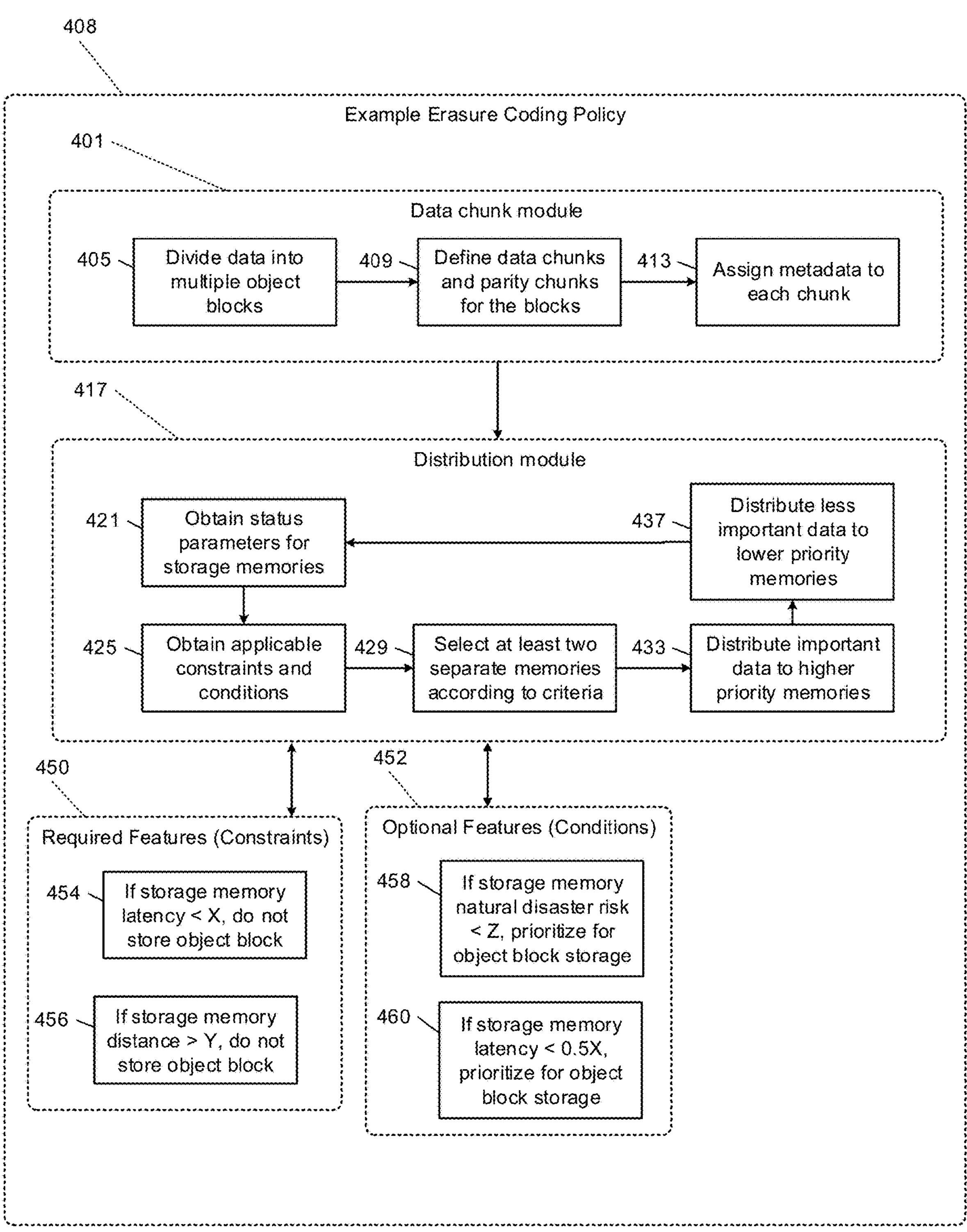
FIG. 4 is a block diagram of an example erasure coding policy for use in the system of FIG. 1.

FIG. 4 illustrates a possible example erasure coding policy 408 that can be stored in a memory. For example, the erasure coding policy 408 may be implemented by the processor(s) to determine where to distribute the object blocks 106A-C among the multiple storage memories 102A-E. As shown in FIG. 4, the example erasure coding policy 408 includes required features 450 and optional features 452.

The example erasure coding policy 408 includes a data chunk module 401, which may be implemented via software and/or hardware, computer-executable instructions stored on a non-transitory computer readable medium, etc. The data chunk module 401 divides data into multiple object blocks at 405, and then defines data chunks and parity chunks for the blocks at 409. For example, a total digital dataset may be separated into a specified number of blocks, with portions of the dataset being assigned to each block. Data chunks and parity chunks are then defined based on the object block arrangement, for storage in separate geographic locations. At 413, the data chunk module 401 assigns metadata to each chunk, which may include specifying whether the chunk is a parity chunk or data chunk, specifying an importance level of the data in the chunk, specifying other attributes of data stored in the chunk, etc.

A distribution module 417 obtains status parameters for storage memories at 421. For example, the distribution module 417 may monitor parameters of multiple geographically distributed storage memories, receive measured status parameters from a master administrator node, etc. The distribution module 417 obtains applicable constraints and conditions at 425, such as the example required features 450 and optional features 452 described further below. At 429, the distribution module 429 selects at least two different memories according to the criteria (such as the storage memories having status parameters that best match the constraints and conditions). The distribution module 417 may distribute important data chunks to higher priority memories at 433 (e.g., data chunks having a higher importance value in their metadata may be assigned to storage memories that satisfy stricter constraints for storage memory risk level, etc.). The distribution module 417 then optionally distributes less important data to lower priority memories at 437 (e.g., data chunks with a lower importance value in their metadata may be assigned to storage memories having status parameters that satisfy less stringent constraints or conditions, or have a higher risk of data loss value, etc.). The distribution module 417 may then return to 421 to again obtain status parameters of the storage memories to check whether data chunks should be redistributed or migrated among the storage memories. In this way, the monitoring of storage memories and distribution of chunks to storage memories may be updated continuously, possibly on a specified periodic basis.

For illustrative purposes, example required features 450 include a latency constraint 454 and a distance constraint 456. For example, the latency constraint 454 may require a storage memory to have a latency of less than X (e.g., less than 5 ms, less than 10 ms, less than 100 ms, etc.). If the storage memory has a latency greater than X, the erasure coding policy 408 will not store object blocks at that storage memory. Similarly, the distance constraint 456 may require a storage memory to have a geographical distance of less than Y miles, kilometers, etc. from a location where the object blocks are being distributed. An example floodplains constraint may be that only X % of data may be stored at a location that is within a 100 year floodplains, while Y % (Y>X) of data may be stored in a 500 year floodplains. Percentage thresholds could be set for other predicted natural disaster likelihoods in different locations, such as earthquake likelihoods along fault lines, historical weather patterns, likelihoods of hurricanes, tornadoes or wildfires, etc.

Example optional features 452 include a natural disaster condition 458 and a latency condition 460. In the example natural disaster condition 458, if the natural disaster risk at a location of the storage memory is low, the storage memory may be prioritized by the erasure coding policy 408 for increased likelihood of storing object blocks. In the example latency condition 460, if the latency of the storage memory is less than 0.5×, the erasure coding policy 408 may prioritize the storage memory for storing object blocks. Various parameters may be balanced or juxtaposed with one another using different weights, ratios, etc. For example, a graphical user interface (GUI) may include slider bars to allow a user to set weights for various conditions, an area plot (such as a spider plot) may be used to show coverages of different conditions of the erasure coding policy 408, etc. In various implementations, any other suitable required and optional features may be used.

FIG. 5 illustrates example pseudo code for an erasure coding policy 508. As shown in FIG. 5, the erasure coding policy 508 may define data chunks, parity chunks, etc., which may each have their own constraints and conditions. Various constraints and conditions may be assigned to each chunk, and may have different values. The erasure coding policy 508 may use the specified constraints and conditions when determining where to distribute chunks of a dataset.

In various implementations, the erasure coding policy may include guarantees on data, such as service level agreements (SLAs), latency SLAs, etc., which may represent constraints of the erasure coding policy. For example, an SLA could be used to create an erasure coding policy where a fee service includes SLAs providing weighted feeds for guarantees. If an SLA is in place, the policy may rely on the guarantees from the SLA to define constraints or conditions according to the SLA definitions, and assume that the status parameters for storage memories associated with the SLA will be met when determining which storage memories should be prioritized for distribution. Given specific constraints, the erasure coding policy may then look to desired optional conditions to determine how to store the object blocks 106A-C, while maintaining satisfaction of the constraints.

The erasure coding policy may implemented to account for data entropy, where data degradation is taken into account. For example, degradation of data at storage memory sites may be used as a tiebreaker for storage memory locations that are similar to one another with respect to constraints and optional conditions. Entropy may be quantified for various storage memories, and accounted for in an erasure coding policy. For example, entropy may be defined according to bits on a platter, cosmic rays on transistors, mean time between failures (MTBF) on disks, etc. These parameters may be monitored or measured and used by an erasure coding policy to determine where to distribute data (e.g., the erasure coding policy may prohibit storing data at a location where the measured entropy value has reduced more than 50% from an average initial hardware value, etc.). In various implementations, the erasure coding policy may drill down into details of storage memories such as how many heads are on drives at the storage memory, usage metrics for different storage memories, matching storage memories to business rules, etc. Example methods for tracking metrics of a system are described in U.S. Pat. No. 8,683,591, titled "Vector-based anomaly detection," which is incorporated herein by reference. For example, the various status parameters of a policy may be tracked as metrics and compared to a desired envelope of nominal behavior. Should the status parameters exceed such an envelope, a corresponding action can be triggered by the erasure coding policy. One should appreciate the '591 patent focuses on anomalies. However, an erasure coding policy might leverage such techniques for triggering data management events (e.g., storing blocks, retrieving blocks, migrating blocks, conducting an inventory of blocks, data integrity checks, etc.).

Referring again to FIG. 1, the processor(s) 110 may be configured to redistribute the multiple object blocks 106A-C of the dataset 104 amongst the multiple storage memories 102A-E. For example, once a specified time period elapses after initial distribution of the multiple object blocks 106A-C, the processor(s) 110 may redistribute the multiple object blocks 106A-C to different storage memories 102A-E, based on the same or different distribution criteria. In various implementations, a time required to store each object block and to transfer each object block may be taken into account when determining whether to redistribute the object blocks 106A-C, thus considering the latency that would be involved in any potential redistribution. The integrity (e.g., checksum, copy comparisons, hash value, etc.) of the dataset can be tested every so often (e.g., regular periods of time, irregular time periods, according to a schedule, according to a service fee schedule, etc.). If the dataset still has sufficient integrity where there are a sufficient number of blocks at their respective locations to reconstruct the dataset, at least to within a desired threshold, then no action may be required. However, if the dataset may be subject to risk, the system can take action by redistributing the objects according to executable instructions associated with the erasure code policy. Further, redistribution could also be triggered by other factors including geographical events, political events, power disruption events, weather events, or other factors that might jeopardize one or more object blocks or that might jeopardize the integrity of the dataset. Thus, it should be appreciated that the erasure code policy can be considered to include one or more redistribution rules sets along with optional triggering conditions. In various implementations, other types of events besides redistribution or migration may be triggered by events. For example, an increased loss risk value at a location may trigger copying of data to another location while leaving the original chunks in place (e.g., if the original location provides faster access to the data, etc.). Deletion of excess chunks may be triggered when data reduces in importance over time.

The redistributed multiple object blocks 106A-C may be allocated amongst the multiple storage memories 102A-E in a different configuration than the allocation of the multiple object blocks 106A-C in the initial distribution. For example, redistributing the multiple object blocks 106A-C may include moving the multiple object blocks 106A-C to locations in the multiple storage memories 102A-E having a lower cost of storage than the initial distribution. In various implementations, data in flight metrics may be used to determine how to redistribute the multiple object blocks 106A-C. For example, the erasure coding policy 108 may allow only a specified amount of data (e.g., quantity of data, number of blocks, number of different blocks, number of types of blocks, etc.) in flight during a redistribution, to ensure that recovery remains possible if there is an issue with the data in flight. Lower percentages of data in flight may be allowed for data that has greater importance, and the data in flight metric may depend on integrity of the transmission network (e.g., higher data in flight percentages may be allowed for networks and storage memories that have higher availability and lower risk of failure).

At different locations, there may be tradeoffs between protection of data and cost, which may take into account natural disasters, electricity consumption, storage configurations, etc. For example, if the object blocks 106A-C of the dataset 104 will be widely distributed, cheaper storage memories 102A-E may be used at each storage location. If the object blocks 106A-C of the dataset 104 will only be stored at a couple of sites, higher quality sites may be used. The storage layer(s) may be flexible, and rebalanced, restored, etc. over time. This may include monitoring of different sites of the storage memories 102A-E, reallocation of the object blocks 106A-C among the storage memories 102A-E, etc. As described above, the erasure coding policy 108 may specify a ratio of, for example, 5:1 (or any other suitable ratio) as a threshold of the tradeoff between protection of data and cost. In this example, a strongly protected storage memory may be used until a measure of the cost of the storage memory relative to a baseline cost exceeds five times a measure of the protection (or loss risk) of the storage memory relative to a baseline protection level. A protection level could be measured as mean time between failures (MTBF), number of 9s in a % system uptime, or other quantifiable factors. For example, if the MTBF increases five-fold over an initial baseline, the erasure coding policy 108 may prohibit storing data at the location. However, if the price drops by half, the erasure coding policy 108 may continue to use the storage location based on the example 5:1 ratio. In various implementations, the policy may specify one or more fractions of parameters, one or more calculated values of parameters, derivatives of parameters (e.g., trends of cost, data protection level, latency, geographic data loss risk, etc., over time).

The importance of the data in the stored dataset 104 may affect evaluation of the sites, the erasure coding policy 108 with respect to the different sites, how the storage is implemented at each site, etc. For example, stored object blocks 106A-C may be checked every month, every six months, every year, etc., which may involve turning on and turning off a storage memory 102A-E. In various implementations, a local management agent may monitor the storage memories and the stored object blocks, and periodically report the parameters to the erasure coding policy 108. For example, a SLA or other "for fee" service may be used to provide a guarantee of maintaining specified status parameters at specific storage memories, the service may alert the erasure coding policy 108 in the event that a status parameter of a storage memory fails to satisfy a specified constraint or condition, etc. The data may be encrypted, where the security of the data is set according to a length of time that the data will be valuable. Further, storage memory 102A-E can support one or more levels of FIPS 140 compliancy (e.g., FIPS 140-2, FIPS 140-3, etc.), which can translate into a policy status parameter, possibly a required criterion. One should appreciate that such abilities may be performed in exchange for a fee, possibly according to a fee schedule, SLA contract, time requirements, or other for-fee factors.

The value (e.g., monetary value, inherent value, importance, security clearance, etc.) of data in the object blocks 106A-C may change over time. For example, if the value decreases towards planned obsolescence, the object blocks 106A-C may be moved to cheaper storage memories 102A-E over time. If cheap storage with poor connectivity is used, the data may be trickled in slowly over time. Computational power may be added at the site, so that even if connectivity is poor, local computational power can process questions that arrive periodically. As an example, data having high importance immediately after creation may be initially stored in object blocks 106A-C in storage memories that are more expensive and have higher security storage. After a specified period (e.g., one week, one month, one year, etc.), or after a specified reduction in use (e.g., after access to the data reduces by fifty percent, ninety percent, etc.), the object storage blocks 106A-C may be moved to a lower security storage memory that has a lower cost. This may be repeated further after additional periods or time, or after further reductions in the amount of times the data is accessed.

In contrast, some data may increase in value over time, such as impact based on news, stock price changes, bank fund information, drug approvals from the Federal Drug Administration (FDA), etc. Increasing value data may be stored with an erasure coding policy 108 that moves the data to more expensive and higher security storage memories 102A-E over time. Consider a scenario where a person stores a cryptocurrency wallet using the disclosed techniques. As the value of the cryptocurrency increases in value, the wallet might be migrated more closely to the user (e.g., closer in latency space) and also increasing redundancy of storage while also ensuring integrity of the wallet.

The erasure coding policy 108 may be modified as desired, to optimize distribution of the object blocks 106A-C according to any desirable parameter(s), such as latency, protection level, bandwidth, etc. For example, a Monte Carlo simulation may be used to optimize one or more aspects of the erasure coding policy 108. More specifically, the Monte Carlo simulation could simulate potential events that might impact storage of the object blocks to determine which configuration or configurations might be the most robust against such events. Historical data can be used to create weighted probability tables by which the Monte Carlo simulation runs the events. The historical data could include mean time between failures (MTBF) of computing equipment (e.g., computers, drives, etc.), weather conditions, power outages, earthquakes, social disruption, epidemics, stock mark fluctuations, or other types of historical data. One should appreciate that Monte Carlo techniques allow for generating one or more robustness measures of an erasure coding policy. For example, based on the simulations, if the robustness measure is 95% (i.e., 95% of the simulations retained accessible data through simulated events), then the erasure coding policy can be considered as robust. Naturally the robustness measure used to make decisions can take on different values according to configurations by an administrator or data manager. In various implementations, the use of Monte Carlo could be run as a service that people subscribe to for a fee. The service may provide alerts to users when status parameters of storage memories change, may trigger redistribution of object blocks 106A-C when status parameters of storage memories change, etc.

Different object blocks 106A-C may have different sizes, one or more of the object blocks 106A-C may include parity data and/or error checking data, etc. The erasure coding policy 108 may divide the dataset 104 into chunks, where each object block 106A-C stores different chunks of the dataset 104. The object blocks 106A-C may have parity data that can be used to reproduce the dataset 104 even if one or more object blocks 106A-C are lost. For example, if a dataset 104 is distributed across five object blocks, the parity data may allow the entire dataset 104 to be reconstructed from only three of the five object blocks (e.g., if two of the object blocks are lost). Consider a scenario where a large dataset has over 100 GB of data, say a human genome. Such a dataset can be compressed via a compression utility application (e.g., Zip folder, 7-Zip™, etc.) and divided into chunks. For example, 7-Zip is able to compress the data and create individual files (i.e., chunks) that are part of a larger whole where each file has a smaller size that can easily managed; say a "file.zip" of 45 GB can be transformed into a file.zip.001 (10 GB), file.zip.002 (10 GB), file.zip.003 (10 GB), file.zip.004 (10 GB), and file.zip.005 (5 GB).

In some implementations, an overabundance of parity blocks may be stored, where a storage overhead is a ratio of data chunks in the object blocks 106A-C to parity chunks in the object blocks 106A-C. For example, five data chunks and ten parity chunks would allow for loss of ten copies without losing data, but may require three times the storage space. Storage clusters may be built where they are filled and then turned off, and as copies of the warm clusters are lost, cold clusters are brought online. This approach may provide a cheaper long-term storage plan that has better access than using tape, etc.

In various implementations, parity chunks may be stored in different locations than data chunks. For example, object blocks containing parity chunks may be distributed to storage memories having cheaper costs, while data chunks are distributed to storage memories having higher availability, etc. Thus, one aspect of the inventive subject matter includes setting parameters within the erasure coding policy 108 based on the nature of type of data objects (e.g., raw data blocks, non-fungible tokens, metadata blocks, parity blocks, etc.).

In some embodiments, the erasure coding policy 108 may define rules for governing behavior of chunks based on chunk metadata. For example, different attributes of chunks stored in the object blocks 106A-C may be monitored, where application programming interfaces (APIs) allow for fine grained management of chunks in the dataset 104 based on metadata attributes. The erasure coding policy 108 may provide support for different classes of data, where a first class of data is treated differently than a second class of data. For example, the erasure coding policy 108 may use non-lossy data copies for a first class of data, and use lossy data copies for a second class of data. In various implementations, different classes of data may be stored in PNG format, BMP format, JPG format, etc., which may be specified according to an importance level assigned to the metadata of a chunk, etc.

In various implementations, the erasure coding policy 108 may define rules for reading data from large massive data sets. Some drives of storage memories support read ahead on micro strips. When performing sequential reads, data may be aligned on multiple storage site locations so that the sequential reads are optimized. In some cases, a large data store may be used, along with satellite data stores that alight with the large one. For example, Filestore by Google may be used for such an implementation. In some embodiments, NVME OS may be used to implement block storage. The system 100 may create a virtualized logical block addressing (LBA) drive mapping to underlying network block storage, thereby creating a fully virtualized, network distributed, robust hard drive. In such a case, a policy might cause a read ahead on blocks where the "read ahead" feature operates based on known latencies. Thus, the system can retrieve blocks, possibly in near-parallel, just in time when they would be needed.

The erasure coding policy 108 may be designed to provide consistency among various stakeholders. In some cases, the erasure coding policy 108 may provide deterministic behavior (e.g., similar to CEPH, journaling, etc.), but may not be too restrictive. The erasure coding policy 108 may ensure consistency in experience rather than pursuing only high determinism, because impacting one portion of the system 100 to address one user could negatively impact other users. In various implementations, the erasure coding policy 108 may have various levels of determinism. The erasure coding policy 108 may include a function that returns parameters for storing object blocks 106A-C, such as a hash function, time-to-live (TTL), etc.

The system 100 may provide a holistic view of all data in the object blocks 106A-C, down to specific chunks of the object blocks 106A-C. This may allow for optimization in determining when to repair data, and allow for auditability of the chunks in the object blocks 106A-C. In some cases, chunks may be stored in blockchains, distributed ledgers, or other notarized ledgers (e.g., BitCoin, Ethereum, hashgraph, IOTA, proof of work ledgers, proof of stake ledger, directed acyclic graph (DAG) ledgers, etc.). The object blocks 106A-C may be used for content creation and subsequent distribution. Still further a dataset or even individual blocks could comprise non-fungible tokens (NFTs), which be stored using disclosed techniques. A notarized ledger could store the NFTs, could point to where the NFTs are permanently stored, or could provide other associations with NFTs. Such an approach aids in mitigation of a loss of an NFT once ownership is transferred after the NFT is originally minted.

The storage memories 102A-E that store the object blocks 106A-C may be arranged in any suitable topology, such as a tree storage topology, a linear storage topology, a star storage topology, a circle storage topology, etc. A hierarchical storage system may be used, where there is a higher priority at the root of the storage system and a lower priority at a leaf of the storage system. The erasure coding policy 108 may include any suitable policy, such as a Reed-Solomon erasure coding implementation, a RAID 3/6 implementation, etc. Example erasure code techniques are described at URL en.wikipedia.org/wiki/Erasure_code.

In various implementations, a data aura (e.g., micro data biome, etc.) may include interactions between people in the same place. A data aura can be considered as a virtual construct representing data bound to an entity, a person for example, or more specifically a device associated with the person (e.g., a cell phone, a smart watch, a data aura device, health sensor, smart clothing, etc.). The data aura represents an area or halo around the person in which data from the person can be shared automatically or manually subject to the erasure coding policy. Such data auras can be bound to other objects as well beyond a person; examples can also include an image, a toy, an automobile, a document, or other types of objects. Handshake protocol(s) may be used to transfer data where the handshake protocol is triggered upon satisfaction of the parameters of the erasure coding policy (e.g., proximity, bandwidth, latency, permissions, authentication, context, etc.). As an example, photos from a vacation could be shared via cell sites, etc. The data may be stored and/or transferred using a linked list, pointers to next object blocks 106A-C in the list, etc. Examples techniques for treating objects like memories are described in U.S. Pat. No. 10,133,742, titled "Event archiving, systems and methods," which is incorporated herein by reference. In various implementations, people or objects may provide initial links to data, where the system follows links (e.g., bread crumbs) to rebuild the data objects. The erasure coding policy 108 may specify a level of security or a level of permitted access to the data objects.

In some embodiments, each of the multiple storage memories 102A-E includes a hash value address, and the processor(s) 110 are configured to generate an index of the multiple storage memories 102A-E according to the hash value addresses. For example, each object storage clusters (e.g., each storage memory 102A-E) may be regularly indexed (e.g., at a specified time period intervals, based on specified events, etc.).

Indexing may allow for easier searching of the storage memories 102A-E for the object blocks 106A-C. Data indices may be combined with other sources to provide more contextual search of the storage memories 102A-E. Each data index may include any suitable information or metadata, such as data size, creation time, creator, indications of data size versus provenance, etc. A geographic location of a storage memory 102A-E may be indexed in a hash space, and data may be transmitted (e.g., torrented, etc.) to hash value address in the same hash space. For example, data may be transmitted to a closest storage memory 102A-E having an address in the hash space, then transmitted to the next closest storage memory 102A-E sequentially. In such embodiments, blocks or chunks can have an ID that adheres to the same hash space as the hash value address of storage devices or systems. In various implementations, descriptors may be used in addition to or alternative to hashes. For example, a descriptor may describe how similar data objects are (like a similarity between two pictures). The descriptors may be used to find similar data in different data objects. Descriptors may be generated from the objects blocks 106A-C, from data in the object blocks 106A-C, in order to determine similarity of the data in the object blocks or how similar one object block is to another. Such descriptors could be built based on word frequencies in text data, image descriptors (e.g., SIFT, DAISY, Canny edges, etc.), audio descriptors, or other descriptors for various data modalities. More specifically, a SIFT descriptor could be represented by a 128 byte value; thus, addresses can be assigned within the 128 byte space.

Each of the multiple storage memories 102A-E may be configured to monitor (e.g., observe, measure, sense, etc.) at least one current status parameter associated with the storage memory 102A-E, and transmit the monitored at least one current status parameter to the processor(s) 110 to implement the erasure coding policy 108. For example, a parameters associated with multidimensional parameter space may be transmitted back to a processor managing the erasure coding policy (e.g., from the monitored parameters of the storage memories 102A-E), and the processor(s) may compare the received values of the parameters in the multidimensional space to distribution criteria of the erasure coding policy 108. Status parameters can be dynamic in nature, and changes in the status parameters may trigger reevaluations of the system 100. For example, as status parameters change over time or in real-time, storage memories that satisfied the erasure coding policy 108 initially may subsequently fail to satisfy the policy. If the status parameters change such that the optimal distribution of object blocks 106A-C changes according to the erasure coding policy 108, the system 100 may redistribute the object blocks 106A-C based on the changed status parameters. In some implementations, the processor(s) 110 may allocate object blocks 106A-C based on importance of the data stored in the object blocks 106A-C.

The dataset 104 may include metadata indicative of one or more properties of the dataset 104. In some embodiments, the processor(s) 110 may be configured to operate a state machine to interpret the metadata and generate the erasure coding policy 108 according to the interpreted metadata. The dataset 104 may include any suitable data, such as health data, bioinformatics data, video data, genomic data, etc.

In one example use case, 40 petabytes (PB) of object storage is distributed across 5 distinct storage clusters in 3 sites. Each cluster is highly available with many access endpoints working in parallel. All data within each cluster is encrypted at rest, and data entering and exiting each cluster is encrypted over the wire.

Each cluster includes several tiers of varying data security relative to storage efficiency. For example, metadata of a chunk may include a security level of data stored in the chunk. The security level could be numeric to indicate a minimum level of security that must be preserved for the data in the chunk. A HIPAA security level may require storage locations that have more stringent data protection safeguards, while less secure data can have a lower security level for storage in less protected storage memories. Erasure coding may allow for far greater flexibility than data replication. For example, lower value data (e.g., mirrors of public data) can be stored at lower protection with a higher efficiency. More valuable data (e.g., clinical genomic BAM files, healthcare data, etc.) can be stored at higher protection. In various implementations, a highest tier of data security may be reserved for data that takes up more storage space with longer storage and access times, while a lowest tier of data security may be reserved for data that takes up the least amount of storage space and can be stored and accessed more quickly than other data.

Data stored at higher protection levels may still be more efficient than traditional redundant array of independent disks (RAID) or data replication storage. For example, a RAID system is a local device having limited redundancy (via mirroring, RAID 5, etc.). In contrast, example implementations described herein eliminate the risk of local storage (e.g., that all copies of data may be destroyed at once due to a fire, earthquake, etc. at the local site), while still maintaining redundancy. For example, different storage pools may be created that balance a level of protection with a cost of protection. Data may be stored in locations having higher and lower levels of data protection according to a specified ratio, and the ratio may be adjusted (e.g., based on metadata associated with the stored object blocks 106A-C of the dataset 104). As described above, the erasure coding policy 108 may specify a ratio that represents the balance of the level of protection with the cost of protection. Different ratios may be used for different pools, where more important data is allocated a higher allowable cost ratio than less important data. For illustrative purposes, data that has been assigned a higher importance value may use an example ratio of 5:1 for protection versus cost, while lower importance data may use a ratio of only 2:1. In this example, if the cost of using a storage memory increases to three times an initial cost, the lower importance data may be migrated to a less protected storage memory, while the higher importance data remains at the higher protected storage memory even with the 3× cost.

Organizational policy may dictate that all data ends up in object storage before the data storage is considered complete. As projects are completed and new ones are started, data may be placed into appropriate locations. A policy may dictate that data should flow into an object store automatically. Data placed into object storage may be considered as immutable.

In some implementations, access to cluster data may be provided via a self-serve secret service that uses credentials to allow authorized users to access specified data. Users may be added or removed to groups with access to different sets of data. Once a user is added to a group they can obtain credentials to access the data at any time, and credentials may be unique per user. All data reads and writes may be logged with credentials, which allows for a full audit trail of all reads and writes of all object store data. For example, events related to access to the dataset or data blocks can be logged within a notarized ledger (e.g., hashgraph, BitCoin, Ethereum, etc.) to ensure an audit or other forms of validation can be conducted with a high degree of credibility.

Various application programming interfaces (APIs) may be implemented for use with the system 100. For example, an object store may use an S3 API, a secret store for credentials may use a Vault API, an object store index and audit trail may be implemented via an Elasticsearch API, etc. This may allow engineers and scientists to access needed data quickly and securely even though data of interest can be spread geographically over a large number of sites or node.

In the system 100, the stored dataset 104 may be processed in any suitable manner, such as a bioinformation analyst quickly locating and using data from any stage of processing or workflow analyzing genomic data, machine learning histopathology specialists locating digital histopathology slides and their markups quickly and easily, software engineers building applications using all layers of an application stack, etc. For example, the genomic data may be stored in various object blocks that are distributed across multiple storage memories. The erasure coding policy 108 may include information about where each of the object blocks are stored, so that the analyst can access each of the object blocks when the analyst is analyzing the genomic data. Similarly, the erasure coding policy 108 may store an identifier that specifies an object block location for each digital histopathology slide and each associated markup, or an object block location of each layer of an application stack. In various implementations, data may be indexed by a workflow state or stage. Example techniques that can be leveraged for indexing digital histopathology are described in U.S. Pat. No. 10,607,343, titled “Digital histopathology and microdissection,” which is incorporated herein by reference.

One example use case of the system 100 is a standalone genome browser that access large amounts of genomic data and renders the genomic data in a human readable format. A browser application passes a user's authentication through to a secret data store, and the browser application presents a specialized search using an object store index that provides access to one or more remote genomic data files, especially HIPAA compliant data files that are considered private to a patient. For example, the erasure coding policy 108 may store locations of various object blocks of genomic data. The locations may be stored secretly, and only accessible by authorized users. Users are able to run a genome browser against any set of BAM files in any object store, and all reads against these BAM files are logged with the user's own credentials as discussed above. For example, the erasure coding policy 108 may obtain a user's credentials, locate object blocks having BAM files accessible to the identified user, and return the files to the user, possible in a SAM file format that is human readable (e.g., via the genomic browser). An example genome browser is discussed in U.S. Pat. No. 10,140,683, titled "Distributed system providing dynamic indexing and visualization of genomic data," which is incorporated herein by reference. Another example use case of the system 100 is a standalone histopathology slide viewer. Users with access to slide images may be able to find and view any slide in any object store, and the index may allow the slide viewer to find and apply any markup or inferred layers. For example, the erasure coding policy 108 may record locations of the storage memories that are currently storing the data for each slide, so that the slide viewer can retrieve the correct histopathology slide for display when selected by an authorized user.

Data coming off of slides may be considered high risk or valuable (e.g., private data, health care data, etc.) as the data is stored in network-attached storage (NAS). Each data storage request may be evaluated individually, where storage consideration factors are combined to generate one or more scores. In various implementations, storage consideration factors may be quantified to generate the scores, such as quantifying an availability of a storage memory, historical data loss risk of the storage memory, latency to transmit data to the storage memory or store data in the storage memory, etc. In various implementations, the factors may be quantified using normalized metrics, sum over weighted metrics, probabilities, look-up tables, tiered-levels, etc. These are just example implementations, and any other suitable quantification techniques may be used. The scores may be single valued, multi-valued, the scores may be generated based on submitting quantified storage consideration factor inputs to functions, etc. Loads of data storage may be balanced to improve efficiency, improve reliability of safe storage of the data, etc. For example, dynamic load balancing may be used to model how data storage activity is going to affect parameters of the distribution criteria, and predictions can be made for determining storage locations.

In some implementations, data may be stored according to a life cycle of the erasure coding policy 108. For example, data may be stored based on a determination of how safe the stored data should be. When the data is first received, a single copy on NAS may be pulled to global data and stored nearby (e.g., at a geographic location close to the NAS location) so the data will be quickly protected. Thus, yet another aspect of the inventive technology includes instrumenting erasure coding polies with time-based criteria or actions. For example, as time passes salient status parameters might age (e.g., decrease in value, increase in value), or status parameters might activate or deactivate based on time triggering conditions.

For incoming data writes to the dataset that will be stored in at least one object block, the incoming data may first be stored in one or more object blocks of the dataset that may located at a specified number of closest site(s) (e.g., one closest site, three closest sites, six closest sites, etc.). A closest site may be determined based on any suitable parameters, such as a closest site based on transmission time, based on physical distance, based on latency, based on bandwidth for transmission, etc. In the future, data could be moved to other sites at more desirable long-term storage locations as extra capacity becomes available. This approach may be implemented using any suitable storage location types, such as server data centers fifth generation (5G) cellular sites, etc.

Predictive analytics may be used to enhance the erasure coding policy 108. For example, the processor(s) 110 may determine where object blocks 106A-C are normally stored in certain conditions, and then determine where to send a next received dataset based on predictive analytics of the erasure coding policy 108 (e.g., via a machine-learning model, via historical trend analysis, Monte Carlo, heuristics, etc.). In various implementations, machine learning may be tied to workflows and data types. For example, machine learning models may be used to predict changes to status parameters of different storage locations, to predict future migration needs for object blocks, to determine optimal distribution of chunks that satisfies the most constraints and condition of an erasure coding policy, etc.

Storage cluster devices may be instrumented from a very low level to a very high level. Metrics may be gathered about individual storage areas, platters, disks, servers, switches, etc., in the system 100 (such as metrics about the different object storage memories 102A-E). Specialized tools may be used to find outliers on performance to ensure smooth operations. All access to clusters may be monitored to watch for high or low loads.

As another example implementation, four different storage clusters may be spread across four different geographic locations, such as Arizona, southern California, northern California, Oregon, etc. When the processor(s) 110 are determining where to store the object blocks 106A-C of the dataset 104, the erasure coding policy 108 may take into account a latency (e.g., time to transmit over a wire, time to receive acknowledgement of a write, round trip time over a wire, ping time, etc.) to store data at the storage memory 102A-E at each geographic location, a data size storage capability of the storage memory 102A-E at each geographic location, an availability of data storage space of the storage memory 102A-E at each geographic location, etc. Example techniques that may be adapted for determining costs to transmit data are described in U.S. Pat. No. 10,637,799, titled "Dynamic packet routing," which is incorporated herein by reference. For example, packets of data chunks and parity chunks may be routed to storage memories by determining which storage memories currently have availability to store the required size of the data chunks at the lowest cost, by determining an amount of time required to transmit data chunks to a storage location based on a latency of transmission to the storage location and size of the data chunks, etc.

For example, four different clinics may participate in a clinical trial, where data from the trial will be received at all four clinics. The processor(s) 110 may be distributed across multiple data generation sites (e.g., locations of system(s) that are generating the data chunks of the dataset 104), may be distributed across multiple storage memories, may be located at a single site, etc. The processor(s) 110 may direct storage locations for the data received at the four different clinics. In some embodiments, business decisions may be built into the erasure coding policy 108, so the processor(s) 110 and/or storage memories 102A-E implement business rules in storing and transmitting the object blocks 106A-C of the dataset 104.

There may be some conditions where a storage memory 102A-E at a geographic locations satisfies some but not all of the distribution criteria of the erasure coding policy 108, and the processor(s) 110 may determine where to store the object blocks 106A-C in response to a storage memory 102A-E meeting a specified threshold of the distribution criteria (e.g., a specified number of satisfied criteria parameters, parameters within a specified range of a target distribution value, an average percentage of target distribution values, etc.). For example, the erasure coding policy 108 may distribute data to a storage location that meets the highest number of distribution criteria, the storage location that is within at least a ten percent range of all distribution criteria, etc.

Each storage memory site may include a proxy service, an edge service, a smart service, or other policy management agent, that may cache data and handle reporting or forwarding of services (e.g., to other storage memories 102A-E, back to the processor(s) 110 implementing the erasure coding policy 108, etc.). In some embodiments, each storage site may keep track of its variables, and a domain name service (DNS) may be implemented. Assigning a hash value or other identifier to each chunk, and registering the chunk as a domain name, may allow for using DNS to find out where the chunk is by resolving a chunk name to an address or proxy. In some embodiments, an identifier may be assigned to each chunk, and a border gateway protocol (BGP) may be used for routing the chunks.

As another example use case, data may be trickled into a data center at a specific location (e.g., the Moses Lake data center in the high plains of Washington, etc.), and the erasure coding policy 108 may be used to write the data to a storage memory 102A-E. Storage cluster sizes may be built according to predicted sizes, and extra disks may be turned off. For example, lower importance data that is access infrequently may be transmitted to a storage location that has high latency but low cost. The data may be trickled in over time because it takes longer than other storage locations to transmit and store data at the lower cost data center. Disks may be turned off over time to save energy or preserve the longevity of the storage, particularly where the data is not accessed for long periods of time. The erasure coding policy 108 may specify that data should be transmitted to a low cost, or even periodically powered off storage location, if the data has not been accessed for at least six months, at least one year, etc.

Data may be transmitted to the storage memory 102A-E in the data center in a lower risk and lower cost method as compared to storing the data at a closer storage memory location (e.g., because the transfer latency is greater than closer storage memory locations, because the available bandwidth for data transfer is less than other storage memory locations, etc.).

Because data may be occasionally lost over time, a disk may be spun down after storage and then periodically spun up to check the disks according to the erasure coding policy 108. Infrastructure may be implemented for when a disk needs to be replaced. Statistics may be provided about drive failures, and the statistics may be used to minimize how often the disks are spun up and spun down. Thus, it should be appreciated storage device physics and mechanical properties can be incorporated into erasure coding policy 108. For example, one or more conditions in the policy can depend on data entropy on the device, MTBF, cosmic ray penetration, wear and tear, speed of access, bandwidth, or other device properties.

In some embodiments, security may be implemented to restrict access to the object blocks 106A-C in the various storage memories 102A-E. For example, an automated access control may be implemented to require user credentials to access the object blocks 106A-C in the various storage memories 102A.

In various implementations, the processor(s) 110 may take one or more actions on data stored in the object blocks 106A-C. For example, data in the object blocks 106A-C may be stored in a distributed or notarized ledger. The processor (s) 110 may perform any suitable functions on the data, such as modifying the contents of the data, formatting the data, standardizing the data, performing algorithmic operations on the data, etc.

Storage Memory Devices

Figure 2:
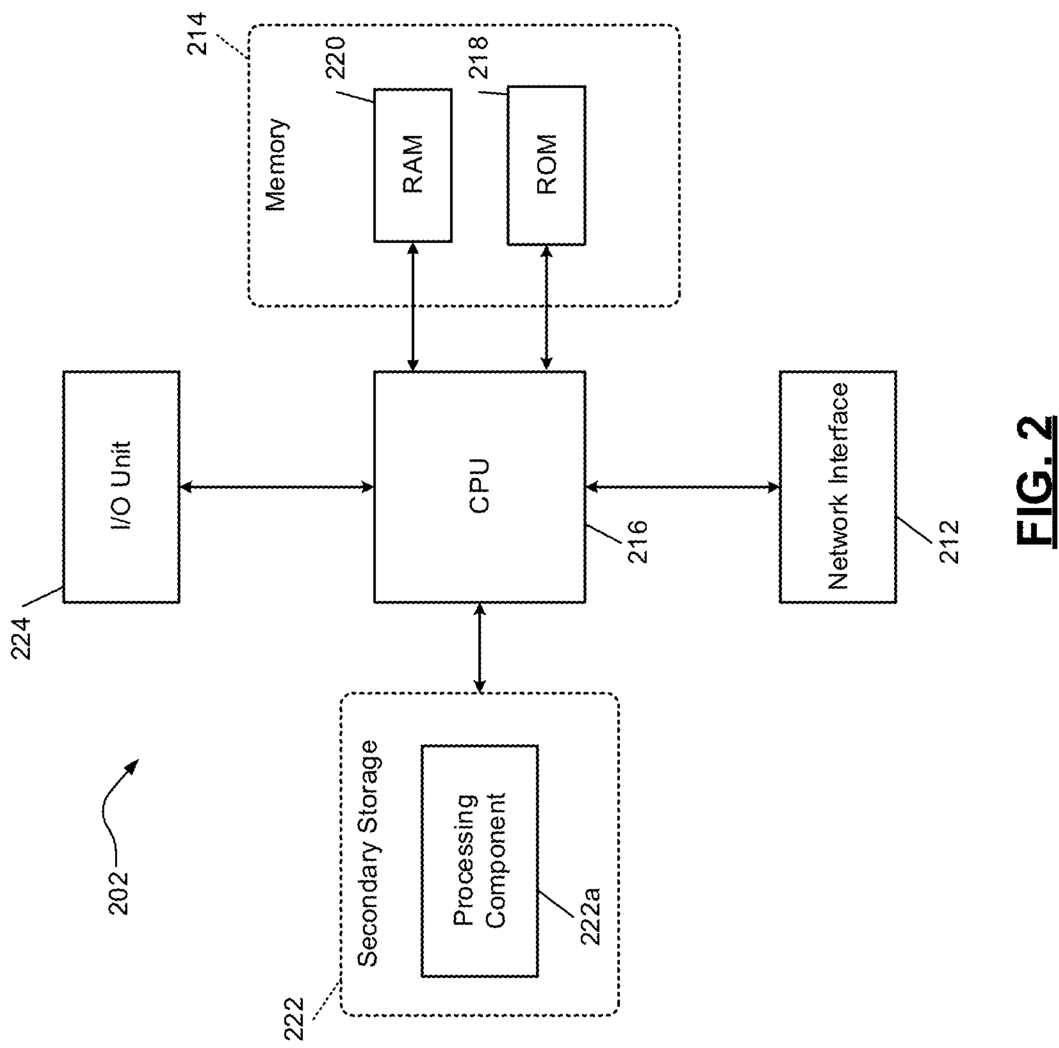
FIG. 2 is a functional block diagram of example storage memory device of the system of FIG. 1.

FIG. 2 illustrates a block diagram of an example device 202, which may correspond to any one of the storage memory devices 102A-E of the geographically distributed erasure coding system 100 of FIG. 1. The device 202 includes one or more processors 216 (which may be referred to as a central processor unit or CPU) that is in communication with memory 214 including optional read only memory (ROM) 218 and optional random access memory (RAM) 220, and optional secondary storage 222 (such as disk drives). The processor 216 may be implemented as one or more CPU chips. The device 202 further includes optional input/output (I/O) devices 224, and network connectivity devices (e.g., a communication interface) 212.

The secondary storage 222 may include one or more disk drives or tape drives. The secondary storage 222 may be used for non-volatile storage of data and as an over-flow data storage device if RAM 220 is not large enough to hold all working data. The secondary storage 222 may be used to store programs which are loaded into RAM 220 when such programs are selected for execution.

In this embodiment, the secondary storage 222 has a processing component **222*a* comprising non-transitory instructions operative by the processor 216 to perform various operations of the methods of the present disclosure. The ROM 218 is used to store instructions and perhaps data which are read during program execution. The secondary storage 222, the memory 214, the RAM 220, and/or the ROM 218** may be referred to in some contexts as computer readable storage media and/or non-transitory computer readable media.

The optional I/O devices 224 may include printers, video monitors, liquid crystal displays (LCDs), plasma displays, touch screen displays, keyboards, keypads, switches, dials, mice, track balls, voice recognizers, card readers, paper tape readers, or other suitable input devices.

The network connectivity devices 212 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards. The devices 212 may promote radio communications using protocols, such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other suitable network devices. These network connectivity devices 212 may enable the processor 216 to communicate with the Internet and/or one or more intranets. With such a network connection, it is contemplated that the processor 216 might receive information from the network, might output information to the network in the course of performing the above-described method operations, etc. Such information, which is often represented as a sequence of instructions to be executed using processor 216, may be received from and outputted to the network, for example, in the form of a computer data signal embodied in a carrier wave.

The processor 216 executes instructions, codes, computer programs, scripts which it accesses from hard disk, floppy disk, optical disk (these various disk based systems may all be considered secondary storage 222), flash drive, memory 214, ROM 218, RAM 220, the network connectivity devices 212, etc. While only one processor 216 is shown, multiple processors may be present. Thus, while instructions may be discussed as executed by a processor, the instructions may be executed simultaneously, serially, or otherwise executed by one or multiple processors.

Although the device 202 is described with reference to a computing device, it should be appreciated that the system may be formed by two or more computing devices in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a dataset by the two or more computers.

In an embodiment, virtualization software may be employed by the device 202 to provide the functionality of a number of servers that is not directly bound to the number of computers in the device 202. The functionality disclosed above may be provided by executing an application and/or applications in a cloud computing environment). Cloud computing may include providing computing services via a network connection using dynamically scalable computing resources. A cloud computing environment may be established by an enterprise and/or may be hired on an as-needed basis from a third party provider.

It is understood that by programming and/or loading executable instructions onto the device 202, at least one of the CPU 216, the memory 214, the ROM 218, and the RAM 220 are changed, transforming the device 202 in part into a specific purpose machine and/or apparatus having the novel functionality taught by the present disclosure. It is fundamental to the electrical engineering and software engineering arts that functionality that can be implemented by loading executable software into a computer can be converted to a hardware implementation by well-known design rules.

Erasure Coding System Management Process

Figure 3:
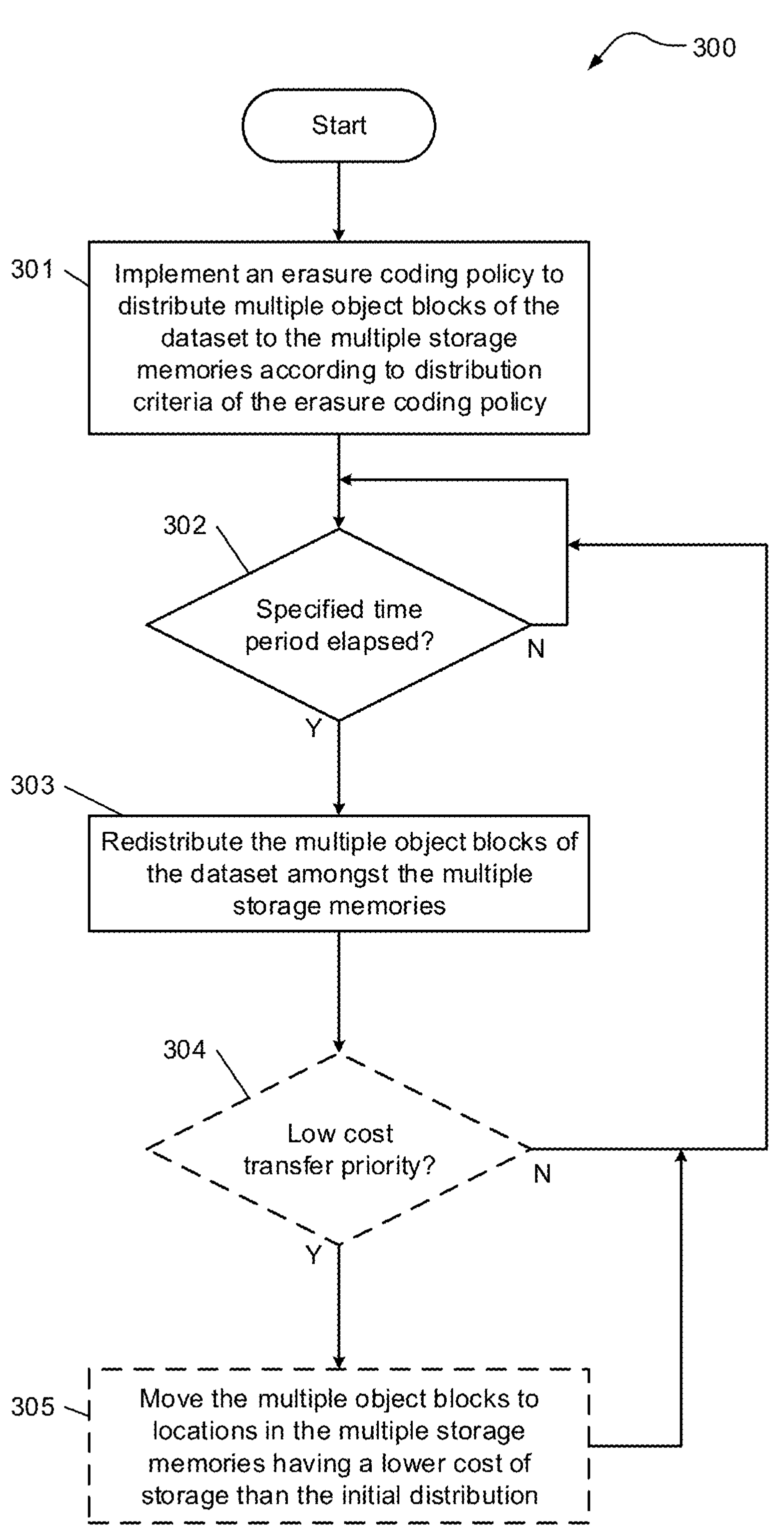
FIG. 3 is a flowchart of an example computer-implemented process for managing a geographically distributed erasure coding system, according to another example embodiment of the present disclosure.

An example computer-implemented method 300 of managing a geographically distributed erasure coding system is illustrated in FIG. 3, according to another example embodiment of the present disclosure. The system includes multiple computer readable, non-transitory storage memories for storing a digital dataset including multiple object blocks, with each storage memory configured to store one or more object blocks of the dataset according to an erasure coding policy, such as the system 100 illustrated in FIG. 1.

In various implementations, the method 300 may be part of a larger block management system that is governed by an erasure coding policy. For example, a block management system may be responsible for storing datasets in object blocks spread out amongst geographically distributed storage memories. The system may be governed by an erasure coding policy that determines how to distribute data chunks among the storage memories, and at least a portion of the erasure coding policy may implement the method 300. As shown in FIG. 3, the method includes implementing, via execution of software instructions on one or more processors, the erasure coding policy to manage or distribute the multiple object blocks of the dataset to the multiple storage memories according to distribution criteria of the erasure coding policy, at block 301. The distribution criteria includes at least one status parameter associated with each storage memory, and the multiple storage memories are geographically distributed at different locations from one another.

For example the status parameter may include a current status parameter of the storage memory, a predicted parameter, a measured parameter, an inferred parameter, a leading indicator parameter, etc. In various implementations, the status parameter may be obtained by directly monitoring or measuring current performance of the storage memory, by predicting a current or future parameter using an algorithm or model, by analyzing historical performance of the storage memory, by calculating a parameter according to other monitored metrics of a storage memory, etc. In various implementations, higher order derivatives may be used to monitor rage of change in parameter values. For example, a latency that is accelerating may indicate that a storage memory is experiencing an overload or degradation issue, and the erasure coding policy may attempt to migrate data chunks out of the storage memory before they are lost or become inaccessible. Example erasure coding techniques may include, but are not limited to, near optimal erasure codes including tornado codes and low-density parity-check codes, near optimal fountain (e.g., rateless erasure) codes including fountain code, online codes, LT codes, raptor codes, and network codes, optimal erasure codes including parity (e.g., as used in RAID storage systems), parchive, Tahoe-LAFS, Reed-Solomon codes, Erasure Resilient Systematic Code, Regenerating Codes, maximum distance separable (MDS) codes, spelling alphabet, etc.

The distribution criteria may include, for each storage memory, a current health status of a network connected to the storage memory, a latency to transmit data to the storage memory, an available bandwidth to transmit data to the storage memory, the specific geographic location of the storage memory, a distance between the specific geographic location of the storage memory and a source of the dataset, a risk of data loss at the specific geographic location of the storage memory, a specified data protection level of the storage memory, a legal privacy or digital rights management requirement of the dataset, a cost of utilizing the storage memory, a capacity of the storage memory, a current availability of the storage memory, etc.

At 302, the method 300 waits for a specified time period to elapse. After the specified time period elapses, the method 300 includes redistributing the multiple object blocks of the dataset amongst the multiple storage memories, a specified time period after initial distribution of the multiple object blocks, at block 303. For example, the method 300 may check to redistribute the object blocks every hour, every day, every week, every month, etc. The time period can comprises a regular period of time, an irregular period of time, a one-shot events, or other time-depending factors. The redistributed multiple object blocks are allocated amongst the multiple storage memories in a different configuration than the allocation of the multiple object blocks in the initial distribution.

The step of redistributing or migrating the multiple object blocks at block 303 may optionally include, as shown in broken lines in FIG. 3, determining whether a low cost transfer priority has been set, at 304. If so, the method 300 may redistribute the blocks by moving the multiple object blocks to locations in the multiple storage memories having a lower cost of storage than the initial distribution, at block 305. The method 300 then returns to 302 to wait for a specified time period before redistributing the blocks again.

A data size of one of the multiple storage blocks may be different than a data size of another one of the multiple storage blocks. The multiple storage memories may be arranged in a tree storage topology, a linear storage topology, a star storage topology, a circle storage topology, etc. A subset of the multiple object blocks may include parity and/or error checking data. Further, one should appreciate that data blocks should be broken down into smaller blocks, aggregated into larger blocks, or the entire dataset could have its blocks completely reorganized under guidance of the erasure coding policy. Reorganization of the blocks may be depending on target storage devices, network characteristics (e.g., MTUs, latency, etc.), or other infrastructure properties.

According to another example embodiment of the present disclosure, a non-transitory computer readable medium including computer-executable instructions, where the computer-executable instructions are executable by a processor to implement an erasure coding policy to distribute multiple object blocks of a digital dataset to multiple storage memories according to distribution criteria, or other management criteria, of the erasure coding policy.

Each storage memory is configured to store one or more object blocks of the dataset according to an erasure coding policy. The distribution criteria includes at least one current status parameter associated with each storage memory, and the multiple storage memories are geographically distributed at different locations from one another. Geographic distribution may include arrangements where the storage memories are in physically separated locations (e.g., different buildings, data centers, server farms, etc.) that are separated by less than 100 yards (such as object blocks stored at physically separated locations on a same business site), up to locations that are separated by thousands of miles (such as data centers located in different states, different countries, etc.).

The dataset may include metadata indicative of one or more properties of the dataset, and the computer-executable instructions may be executable by the processor to operate a state machine to interpret the metadata and generate the erasure coding policy according to the interpreted metadata. The dataset may include health data, bioinformatics data, video data, genomic data, etc.

In some embodiments, each of the multiple storage memories includes a hash value address, and the computer-executable instructions are executable by the processor to generate an index of the multiple storage memories according to the hash value addresses. Each of the multiple storage memories may be configured to monitor the at least one current status parameter associated with the storage memory, and transmit the monitored at least one current status parameter to the processor to implement the erasure coding policy. The erasure coding policy may include any suitable policy, such as a Reed-Solomon erasure coding implementation. The distribution criteria may include at least two current status parameters associated with each storage memory. In various implementations, other types of error correcting may be used, such as hamming codes, RAID 5 implementations (e.g., including a parity block, etc.), locally repairable codes, etc.

The erasure coding policy can be implemented through any one or more suitable techniques. In some embodiments, the policy can be considered a collection of one or more data structures carrying information relating to the policy. For example, the erasing coding policy can include a data structure or a data member that binds a specific policy to one or more data objects via a pointer (e.g., disk name, file system, file name, URL link, UUID, GUID, etc.). This approach allows a single policy to govern the behavior of different levels of storage. Further, multiple policies can be bound to the same data objects allowing for erasure coding policies to be inherited from one level of the data storage system to another. More specifically, a file could have its own specific policy and then inherit the policy of the folder/directory in which the file resides, and so on. In more preferred embodiments, conflicting conditions in policies can be resolved by raising them to a manager or via one or more conflict resolution rules sets.

Additional data structures or data members can also include information about the specific nature of the erasure coding policy. The policy governs how a dataset can be reconstructed if necessary, and the policy can also include data relating to a fraction code rate for the policy. The code rate (r) represents the ratio of the original dataset size in blocks (k) to the total number of blocks (n) stored; thus r=k/n. When r is small, the total number of blocks stored is large, likely indicating high redundancy. Still further, the policy can include a reception efficiency (e) indicating how many blocks are required for recovery (m), where e=m k. The value of m is less than n. As discussed previously, many factors, attributes or other parameters can impact how the policy behaves with respect to storing the data over multiple storage sites. In practice, the parameters affect the code rate and/or the reception efficiency.

In some embodiments, the code rate and/or the reception efficiency can be set directly via a software interface (e.g., web page, application, GUI, API, etc.) under the command of an administrator or another device possibly via an API. In other embodiments, the values can be set as a function of the various parameters in the ecosystem as discussed previously. The parameters can be placed in a look up table having corresponding weights or other values that impact the code rate or reception efficiency. As each parameter is selected or set for inclusion with the erasure coding policy, its corresponding value can be placed into the function to determine the rate or efficiency. For example, geographical distance might be important, but come at a cost of latency. Thus, it is conceivable that the code rate might decrease indicating an increased value of n, while the reception efficiency might be low so that the original dataset can be recovered from a small set of blocks. The various values of the erasure coding policy (e.g., e, r, n, k, m, etc.) can be determined by executing a function (e.g., a mathematical function, software function, method, procedure call, etc.) based on the values obtained from the look up tables, to aggregate the information to yield a desired performance of the erasure coding policy. In various implementations, values of the erasure coding policy may be set via a service, via a user interface, via a Monte Carlo implementation, etc.

The parameters of the ecosystem can adhere to an a priori defined namespace to allow for comparison amongst the various elements of the ecosystem. Each element can be tagged with attributes and/or values from the namespace where the attributes can be stored as metadata within the data structures of the policy, for example. More specifically, elements in the ecosystem can include files in a file system, a file system itself (e.g., NTFS, ZFS, FAT-32, ext3, ext4, etc.), data storage devices (e.g., disk drives, flash, RAM, etc.), storage structures (e.g., disk partitions, storage blocks on a disk, etc.), computing devices, rack-based units, RAID systems, NAS systems, SAN system, or even the policies themselves can have attribute tags that adhere to the namespace. This approach may ensure that elements can be managed in a cohesive manner and on equal footing. For example, files can be tagged with metadata indicating the files can be stored on storage devices that are more at risk because the data is not mission critical or is temporary data. Thus, erasure coding policy can be used by the system to query devices that have similar attributes (i.e., storage at some risk). One aspect of the inventive subject matter is considered to include the concept of such disparate elements in the ecosystem sharing a common namespace and mapping functionality features of the erasure coding policy among the elements based on the attributes and any corresponding value of the namespace. Example namespaces could follow a hierarchical structure representing how attributes are stored, and ontology, or other forms of namespaces. For example, a location attribute could be subdivided into different sub-types: zip code, latitude and longitude, Google Plus Code (see URL plus.codes), S2 cell identifiers, or other type of location identifiers. Each attribute can also be accompanied by one or more appropriate values if necessary; for example, "LOCATION. LAT+LONG::{33.9225717, −118.393509}" represents an attribute followed by one or more corresponding values. Such attribute-value pairs can then be used to satisfy an erasure coding policy's requirements (e.g., distance between storage blocks, redundancy, latency, etc.).

Beyond data structures or data members per se, erasure coding policies can also include executable software instructions (e.g., object code, byte codes, scripts, programs, utilities, etc.) stored in a computer memory. Thus, in some embodiments, erasure coding policies can be constructed or otherwise instantiated from object oriented classes having one or more executable methods. Corresponding policy objects can have traditional methods such as constructors, destructors, set( ), get( ) or other methods. Additionally, the policy objects can also have other forms of executable code as alluded to previously. For example, a policy object can be provisioned with one or more migration methods or redistribution methods that enforce corresponding data migration or redistribution policies. When triggering conditions are met, possibly based on criteria defined according to the attribute namespace, these methods can be invoked. Additional executable methods can include monitoring methods to keep track of current local or remote conditions; inventory methods that compiling information about hardware, software, capabilities, etc.; alerting methods that generate notifications when conditions arise; reporting methods that compile information according to desired formats or at desired times; recover methods that repair or otherwise reconstruct original datasets; security methods that enforce authorization, permissions, encryption, decryptions, or other security measures; or other types of methods that facilitate management of the overall system or its constituent parts.

Clearly, erasure coding policies can be become quite complex. Additional complexities can also arise when specific data requirements are placed on the system. For example, healthcare data must adhere to privacy concerns due to HIPAA compliance or secrecy. Thus, there is a need for erasure coding policy tools by which individuals can construct policies that fit use-case requirements. Such tools can provide access to the aforementioned namespace through which the individual can construct appropriate features, triggers, events, or other components of the policies. The tools can further allow the individual to define the nature of the policies at various levels of detail from the overarching data management system down to files, and even further down to records or fields in the files. Such tools can provide one or more interfaces through which individuals can access the features and capacities of the tool. Example interfaces can include a web interface, RESTful APIs, APIs, GUI, or other forms of interfaces. In some embodiments, the erasure encoding policies can be provisioned via existing software interfaces such as OpenNMS (see URL www.opennms.com).

The erasure coding policy governs the distribution or management of data blocks of a dataset. Depending on the use-case or embodiment, one should appreciate that the blocks can be considered to exist at different levels within a data storage architecture. In some embodiments, the erasure coding policy can operate at a file level or file system level where the policy is applied to files in the file system. The policy can then chunk the file into blocks for distribution. In such embodiments, the erasure coding system can be considered "above" files in a file system stack. In other embodiments, the erasure coding can be considered "below" files, where the blocks represent a fundamental block of a file system where files are built from the blocks. In this scenario, the file system can be built on top of the erasure coding policy ecosystem. The advantage of such an approach is that users of the files are not required to interact with the erasure coding policy directly because it is a fundamental part of the storage system. Thus the erasure coding policy ecosystem forms an intermediary layer between the file system and the low level storage structure (e.g., SAN, RAID, MongoDB, bittorrent, etc.). A data storage system that would be quite amenable for use with the disclosed approach includes Ceph (see URL ceph.io).

In an example use case, a streaming service such as Netflix may monitor for particular movies or shows that are trending in a specific location. The erasure coding policy may include moving data chunks to locations that are best served to deliver content. For example, the erasure coding policy may move data chunks to storage memories that are geographically closest to the location where a particular movie or show is trending. This may also free up space for other services in other locations.

The example uses above for the erasure coding systems described herein are for purposes of illustration only, and are not intended to limit the scope of the present disclosure. The example systems and methods described herein could be used in any application where erasure coding is implemented, where storage memories are geographically distributed, where stored datasets include multiple object blocks, etc.

As described herein, the example system components may include a microprocessor, microcontroller, integrated circuit, digital signal processor, etc., which may include memory. The example system components may be configured to perform (e.g., operable to perform, etc.) any of the example processes described herein using any suitable hardware and/or software implementation. For example, the system components may execute computer-executable instructions stored in memory, may include one or more logic gates, control circuitry, etc.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A distributed digital object storage system comprising:

at least one non-transitory computer readable memory storing a suite of software instructions; and at least one processor coupled with the at least one non-transitory computer readable memory and that performs the following operations upon execution of the software instructions:

establishing, in the at least one non-transitory computer readable memory, at least one erasure coding policy for a dataset, the at least one erasure coding policy including distribution criteria defined based on location attributes associated with distributed storage node locations of distributed storage nodes and based on a data chunk type attribute associated with the dataset, wherein the location attributes adhere to a common hierarchical namespace including S2 cell identifiers, each of the distributed storage node includes a location attribute having an S2 cell identifier value indicating a location of the distributed storage node according to a hierarchy of S2 cells, and the at least one erasure coding policy includes at least a specified distance between distributed storage node locations in the hierarchy of S2 cells based on S2 cell identifier values of the location attributes corresponding to each of the distributed storage nodes;

creating multiple object blocks from the dataset, each block of the multiple object blocks having a data chunk type attribute;

establishing separated block storage locations among the distributed storage nodes for the multiple object blocks according to the distribution criteria including the S2 cell identifier values of the location attributes of the distributed storage nodes and the data chunk type attributes of the multiple object blocks, wherein establishing separated block storage locations includes determining a minimum separation distance between separated block storage locations based on an S2 cell identifier value associated with each separated block storage location and at least one risk metric, and determining a maximum separation distance between separated block storage locations based on the S2 cell identifier value associated with each separated block storage location and a constraint associated with the at least one risk metric; and storing, over a network, the multiple object blocks at their respective separated block storage locations on the distributed storage nodes according to the erasure coding policy.

2. The distributed digital object storage system of claim 1, wherein the location attributes comprise location identifiers.

3. The distributed digital object storage system of claim 2, wherein the location identifiers comprise geographic location identifiers.

4. The distributed digital object storage system of claim 2, wherein the location identifiers comprise at least one of the following: a zip code, a longitude, a latitude, or a plus code.

5. The distributed digital object storage system of claim 1, wherein the location attributes adhere to location address space of the distribute storage nodes.

6. The distributed digital object storage system of claim 5, wherein each of the multiple object blocks have identifiers adhering to the location address space.

7. The distributed digital object storage system of claim 6, wherein the location address space comprises a hash address space.

8. The distributed digital object storage system of claim 1, wherein the data chunk type attributes adhere to a common namespace.

9. The distributed digital object storage system of claim 8, wherein the common namespace comprises an a priori defined namespace.

10. The distributed digital object storage system of claim 8, wherein the common namespace comprises attribute-value pair parameters.

11. The distributed digital object storage system of claim 1, where in the at least two of the distributed storage nodes are separated by at least 100 miles.

12. The distributed digital object storage system of claim 11, wherein the at least two nodes are separated by at least 1000 miles.

13. The distributed digital object storage system of claim 1, wherein the distributed storage nodes comprise at least one of the following: a network area storage system, a storage area network system, or a RAID system.

14. The distributed digital object storage system of claim 1, wherein the at least one erasure coding policy enforces a code rate representing a ratio (r) of a number of blocks in the dataset (k) to a total number of block in the multiple object blocks (n), wherein n is greater than k.

15. The distributed digital object storage system of claim 1, wherein the data chunk type attribute of at least one block in the multiple object blocks represents a data chunk.

16. The distributed digital object storage system of claim 15, wherein the data chunk type attribute of the at least one block in the multiple object blocks represents a redundant data chunk.

17. The distributed digital object storage system of claim 1, wherein the data chunk type attribute of at least one block in the multiple object blocks represents a parity chunk.

18. The distributed digital object storage system of claim 1, wherein the operations further include recording an event related to at least one block in the multiple object blocks on a notarized ledger.

19. A method of implementing an erasure coding policy for a distributed digital object storage system, the method comprising:

establishing, in at least one non-transitory computer readable memory, at least one erasure coding policy for a dataset, the at least one erasure coding policy including distribution criteria defined based on location attributes associated with distributed storage node locations of distributed storage nodes and based on a data chunk type attribute associated with the dataset, wherein the location attributes adhere to a common hierarchical namespace including S2 cell identifiers, each of the distributed storage node includes a location attribute having an S2 cell identifier value indicating a location of the distributed storage node according to a hierarchy of S2 cells, and the at least one erasure coding policy includes at least a specified distance between distributed storage node locations in the hierarchy of S2 cells based on S2 cell identifier values of the location attributes corresponding to each of the distributed storage nodes;

creating multiple object blocks from the dataset, each block of the multiple object blocks having a data chunk type attribute;

establishing separated block storage locations among the distributed storage nodes for the multiple object blocks according to the distribution criteria including the S2 cell identifier values of the location attributes of the distributed storage nodes and the data chunk type attributes of the multiple object blocks, wherein establishing separated block storage locations includes determining a minimum separation distance between separated block storage locations based on an S2 cell identifier value associated with each separated block storage location and at least one risk metric, and determining a maximum separation distance between separated block storage locations based on the S2 cell identifier value associated with each separated block storage location and a constraint associated with the at least one risk metric; and storing, over a network, the multiple object blocks at their respective separated block storage locations on the distributed storage nodes according to the erasure coding policy.

20. A non-transitory computer-readable medium comprising computer-executable instructions configured to, when executed by at least one processor, cause the processor to perform operations including:

establishing, in at least one non-transitory computer readable memory, at least one erasure coding policy for a dataset, the at least one erasure coding policy including distribution criteria defined based on location attributes associated with distributed storage node locations of distributed storage nodes and based on a data chunk type attribute associated with the dataset, wherein the location attributes adhere to a common hierarchical namespace including S2 cell identifiers, each of the distributed storage node includes a location attribute having an S2 cell identifier value indicating a location of the distributed storage node according to a hierarchy of S2 cells, and the at least one erasure coding policy includes at least a specified distance between distributed storage node locations in the hierarchy of S2 cells based on S2 cell identifier values of the location attributes corresponding to each of the distributed storage nodes;

creating multiple object blocks from the dataset, each block of the multiple object blocks having a data chunk type attribute;

establishing separated block storage locations among the distributed storage nodes for the multiple object blocks according to the distribution criteria including the S2 cell identifier values of the location attributes of the distributed storage nodes and the data chunk type attributes of the multiple object blocks, wherein establishing separated block storage locations includes determining a minimum separation distance between separated block storage locations based on an S2 cell identifier value associated with each separated block storage location and at least one risk metric, and determining a maximum separation distance between separated block storage locations based on the S2 cell identifier value associated with each separated block storage location and a constraint associated with the at least one risk metric; and storing, over a network, the multiple object blocks at their respective separated block storage locations on the distributed storage nodes according to the erasure coding policy.

* * * * *